United States Patent [19]
Linley, Jr.

[11] 3,831,460
[45] Aug. 27, 1974

[54] ANTI-BACKLASH NUT
[76] Inventor: Francis M. Linley, Jr., Banks Rd., Easton, Conn. 06612
[22] Filed: Aug. 20, 1973
[21] Appl. No.: 390,069

[52] U.S. Cl.................. 74/459, 74/424.8 A, 74/441
[51] Int. Cl..... F16h 55/22, F16h 55/18, F16h 1/18
[58] Field of Search................ 74/424.8 A, 441, 459

[56] References Cited
UNITED STATES PATENTS
2,567,483   9/1951   Hotine.............................. 74/441 X Primary Examiner—Leonard H. Gerin
Attorney, Agent, or Firm—H. Gibner Lehmann; K. Gibner Lehmann

[57] ABSTRACT

An anti-backlash nut construction for engagement with threads of a screw, the nut comprising a base portion and a threaded portion connected therewith. Both portions have central bores in alignment with one another to receive the screw. The threaded portion is elongate and slotted, comprising two elements which are capable of limited movement toward and away from one another. The nut threads are disposed on the internal surfaces of these elements. An O-ring or equivalent carried in a grooved formation on the outside surfaces of the elements biases the latter toward each other such that the internal threads thereon are brought into close engagement with the screw threads, thus eliminating all looseness and minimizing substantially all of the clearance space between the nut and screw threads which would otherwise give rise to undesirable backlash. An alignment sleeve for the nut is also provided to accommodate slight misalignment between the axes of the screw and the nut.

18 Claims, 23 Drawing Figures

PATENTED AUG 27 1974 3,831,460

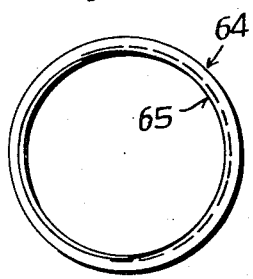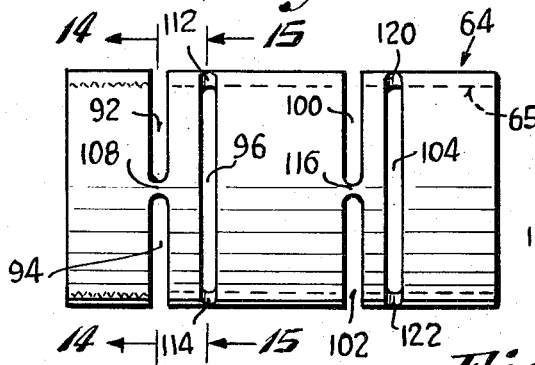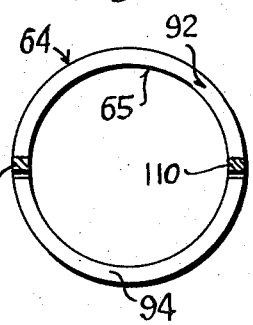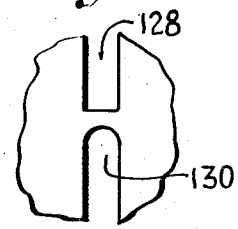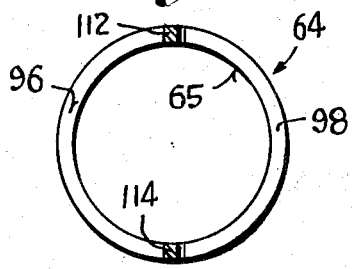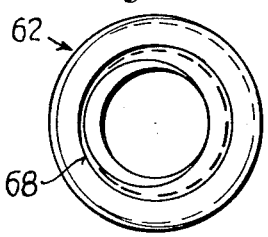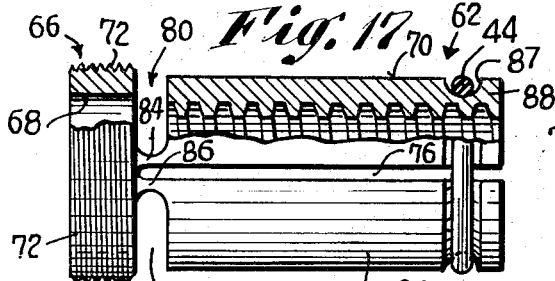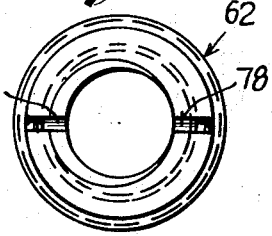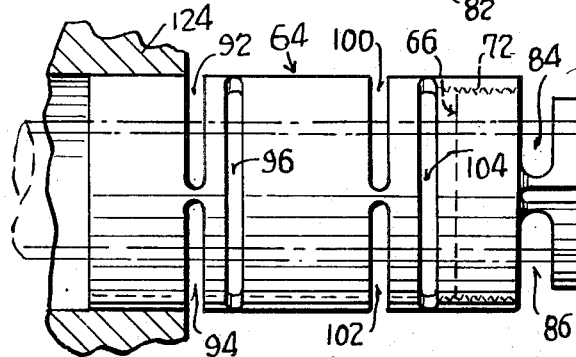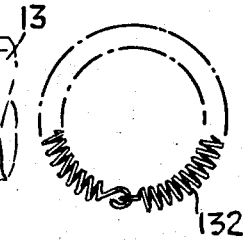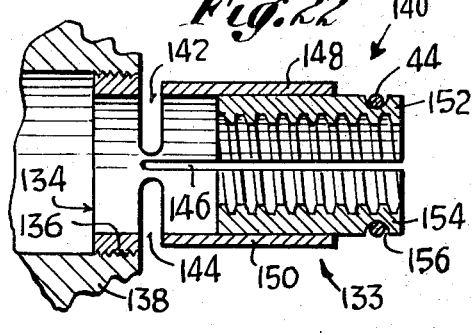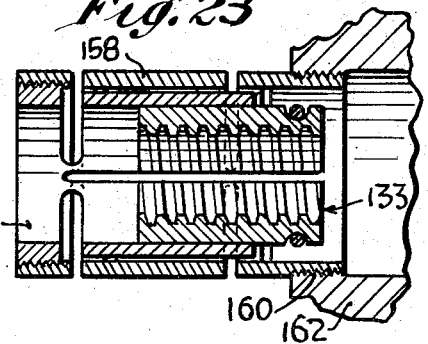

3,831,460

ANTI-BACKLASH NUT

BACKGROUND

This invention relates generally to a nut or follower device for engaging the external threads of a screw, and more particularly to devices of this nature which minimize or eliminate backlash. In the past a number of such anti-backlash structures have been proposed and produced. Several have involved the use of thread formations which were made with a very high degree of accuracy such that any spaces between the mating threads were sufficiently small so as to not give rise to objectionable backlash. Other arrangements involved the use of multiple nuts which were spring biased in opposite directions such that each nut would be engaging oppositely directed surfaces of the V-thread formation of the screw. Still other devices involved the use of aligned back-to-back spur gears which were springbiased for opposite relative rotation, wherein several teeth of the one gear would engage one set of said surfaces of the V-thread on the screw, and several teeth of the other gear would engage the oppositely-directed set of said surfaces of the V-thread. While the above arrangements operated reasonably well, there were a number of problems which arose. The cost of producing high accuracy thread devices often made their use prohibitive. The employment of multiple nits or spur gears was similarly costly, and also created the additional problem of providing a satisfactory mounting means for such members. In some circumstances a special type of thread gear formation was required, and in these cases the added expense was substantial.

SUMMARY

The above drawbacks and disadvantages of prior anti-backlash nut devices are obviated by the present invention which has for an object the provision of a novel and improved anti-backlash nut which is extremely simple in construction, yet reliable in operation and virtually maintenance free. A related object is the provision of a nut construction as above characterized which has a minimum number of separate parts, some of which are capable of being molded in simple plastic mold cavities.

The above objects are accomplished by a nut or follower construction comprising a base portion and a threaded portion, both portions having hollow bores in alignment with one another to receive the screw. The threaded portion is elongate and has oppositely disposed longitudinal slots in each wall, thus dividing it into a pair of elements which are capable of limited flexing movement toward and away from one another. The inner surfaces of the elements are provided with internal thread formations for engaging the threads of the screw. Biasing means comprising an O-ring or equivalent device disposed in a transverse groove on the external surfaces of the elements, urges the latter into close engagement with the threads of the screw such that no looseness occurs between the cooperable screw and nut threads. The arrangement thereby eliminates all backlash and looseness between the threads.

Other features and advantages will hereinafter appear.

In the drawings, illustrating several embodiments of the invention:

FIG. 12 is a top plan view of the alignment sleeve part of FIGS. 8–11.

FIG. 13 is a left end elevation of the alignment sleeve of FIG. 12.

FIG. 14 is a section taken on line 14—14 of FIG. 12.

FIG. 15 is a section taken on line 15—15 of FIG. 12.

FIG. 16 is a fragmentary view of a modified sleeve, illustrating an alternate configuration for the transverse notches in the sleeve, the modifed sleeve constituting another embodiment of the invention.

FIG. 17 is a view partly in elevation and partly in section illustrating a further modified nut construction, constituting another embodiment of the invention.

FIG. 18 is a left end elevation of the nut construction of FIG. 17.

FIG. 19 is a right end elevation of the nut construction of FIGS. 17 and 18.

FIG. 20 is a top plan view of a combined nut and sleeve assembly similiar to that illustrated in FIGS. 8–11, except that a portion of the nut is disposed externally of the sleeve, this constituting another embodiment of the invention.

FIG. 21 is a front elevational view of a garter spring employed in the assembly of FIG. 20.

FIG. 22 is a vertical section of a modified nut construction incorporating an element constituted of antifriction nut material for engagement with the threads of the screw, this construction constituting still another embodiment of the invention.

FIG. 23 is a vertical section of an assembly comprising the nut construction of FIG. 22 and the alignment sleeve of FIGS. 12–15, this assembly constituting still another embodiment of the invention.

Figure 1:
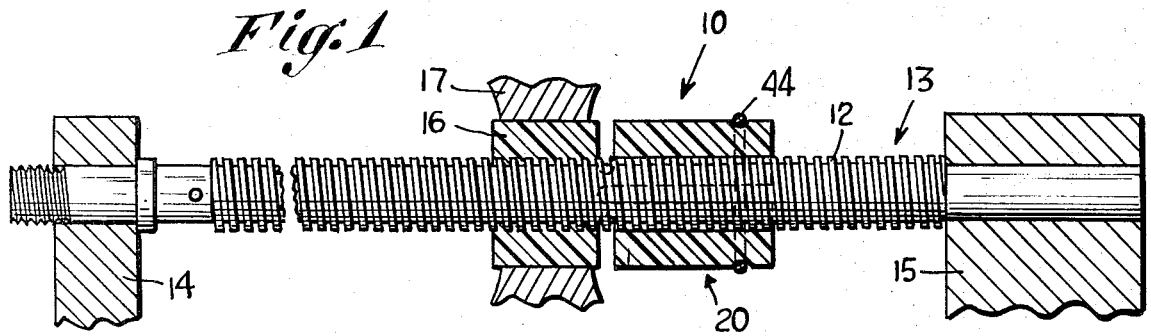
FIG. 1 is an axial sectional view of the improved, antibacklash nut construction of the present invention, shown engaging a screw turnably carried on bearing supports.
Figure 4:
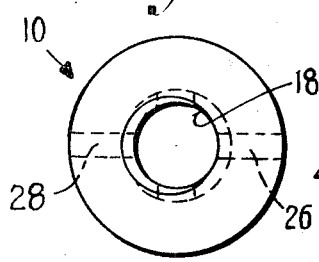
FIG. 4 is a left end elevational view of the nut construction of FIGS. 1–3.
Figure 2:
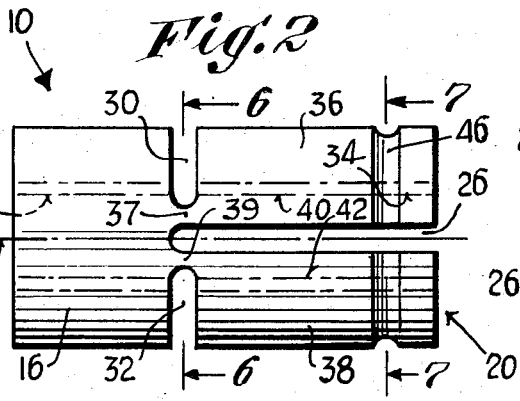
FIG. 2 is a front side elevational view of the nut construction of FIG. 1.
Figure 5:
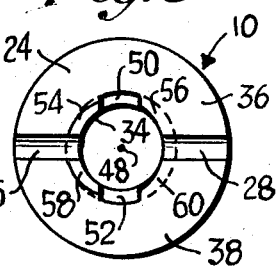
FIG. 5 is a right end elevational view of the nut construction.
Figure 6:
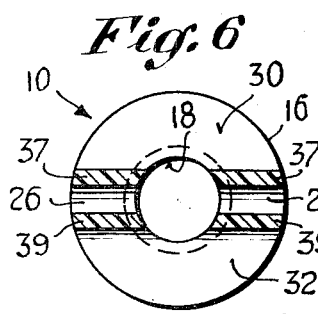
FIG. 6 is a section taken on line 6—6 of FIG. 2.
Figure 3:
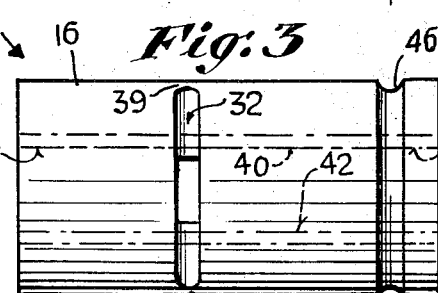
FIG. 3 is a top side or plan view of the nut construction.
Figure 7:
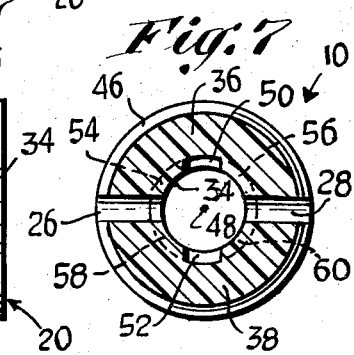
FIG. 7 is a section taken on line 7—7 on FIG. 2.

Referring to FIGS. 1–7 and in accordance with the present invention there is illustrated an anti-backlash nut construction generally designated by the numeral 10, for engagement with the external threads 12 of a screw 13 rotatably carried on bearings 14, 15. The nut comprises a base portion 16 which is carried by a movable machine part 17 such as a reciprocatable carriage (not shown) or the like, and a threaded portion 20 connected with the base portion. In this embodiment, the base portion 16 also has a bore 18 with internal threads engageable with the screw threads 12, but such a construction is not necessary for the operation of the anti-backlash feature to be described below. The threaded portion 20 has a slotted configuration as best illustrated in FIGS. 2, 3, 5 and 6. The threaded portion 20 is elongate and has an annular wall 24 with a pair of oppositely disposed, longitudinal slots 26, 28 (see FIG. 5), both of which are open at one end as shown. In addition, the annular wall 24 has two oppositely disposed transverse slots 30, 32, which communicate with the bore 34 of the annular wall 24 as shown. The longitudinal slots 26, 28 divide the threaded portion 20 of the nut 10 into two elements 36, 38 having internal surfaces making up the bore 34 of the threaded portion, each of the elements having internal thread formations 40, 42 for engagement with the screw threads 12. The cut-out configuration of the threaded portion 20 defined by the transverse slots 30, 32 and the longitudinal slots 26, 28 enables the elements 36, 38 to have limited flexing movement toward and away from one another. It can be seen that by this arrangement, the base portion 16 is joined to the threaded portion 20 by two "hinge" formations 37, 39, each formation being constituted of two separate parts on opposite sides of the bore 34 (FIG. 6).

In accordance with the present invention there is further provided a yieldable means carried by the elements 36, 38 for biasing the same in directions toward each other so as to maintain an absence of clearance space between the element thread formations 40, 42 and the screw threads 12, such means comprising an O-ring 44 constituted of rubber or rubber-like material which is carried in a transverse groove 46 disposed in the outer surfaces of the elements 36, 38 as shown. The O-ring has sufficient spring characteristics to urge the elements toward one another until a moderately firm engagement with the screw threads 12 is achieved, whereby no clearance spaces exist between the screw threads 12 and thread formations 40, 42 of the elements. As a result, during rotation of the screw, both of the oppositely disposed angular faces of the thread on the screw are at all times engaged by the internal thread formations on the elements of the nut. Hence, unlike a conventional nut, wherein only one face of the screw thread is engaged by an oppositely disposed face of the nut thread for a given relative sense of rotation, the present nut construction maintains engagement at all times with both faces of the screw thread, and thus no discontinuity occurs when there is a change of direction.

As shown particularly in FIGS. 2–7, the element thread formations define an axis 48 coincidental with the axis of the thread helix thereof. By the present invention, the elements 36, 38 have elongate grooves 50, 52 respectively, substantially parallel with the axis 48. The groove 50 divides the thread formation 40 into two separate, threaded flutes 54, 56. Similarly, the groove 52 divides the thread formation 42 into two separate threaded flutes 58, 60. The grooves eliminate the possibility that a large axial force applied to the nut with respect to the screw would cause the elements to be sprung away from one another whereby the nut would "jump" several of the screw threads. By provision of the grooves 50, 52, the radial component of the forces on the elements in the direction tending to separate them is greatly reduced, and no "jumping" of the threads will occur, even under conditions of substantial axial loading.

Figure 8:
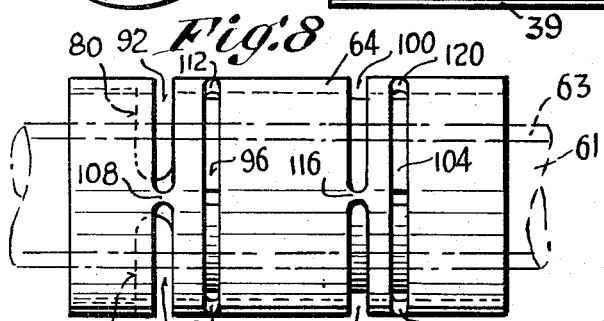
FIG. 8 is a top plan view of another embodiment comprising an anti-backlash nut somewhat similar to that of FIGS. 1–7, and an alignment sleeve carrying the nut.
Figure 10:
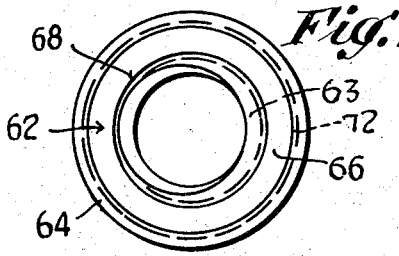
FIG. 10 is a left end elevation of the assembly of FIGS. 8 and 9.
Figure 9:
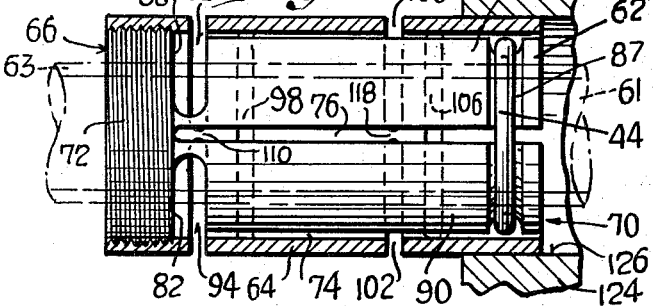
FIG. 9 is a view, partly in section and partly in elevation of the assembly of FIG. 8.
Figure 11:
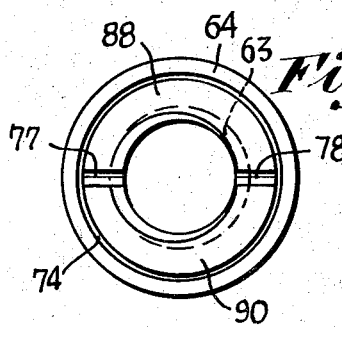
FIG. 11 is a right end elevation of the assembly of FIGS. 8–10.

Another embodiment of the invention is illustrated in FIGS. 8–15 and 17–19, showing a screw 61 and an antibacklash nut construction generally designated by the numeral 62 in conjunction with an annular alignment sleeve 64 which is shown particularly in FIGS. 12–15. Referring to FIGS. 8, 9 and 17–19, the nut construction 62 comprises a threaded portion 70 and a base portion 66 which has an unthreaded hollow bore 68. As shown in FIGS. 9 and 17, the base portion 66 has external screw threads 72 which are received in a corresponding internally threaded portion of the sleeve 64. It will be seen that the other end of the sleeve 64 has a greater diameter than that of the nut 62. The space therebetween has been designated 74 in FIG. 9. As in the previous embodiment, the nut 62 is elongate and is provided with longitudinal slots 76, 78 and transverse slots 80, 82. It can be understood that the base portion 66 is joined to the threaded portion 70 by means of two bridges 84, 86 (FIG. 17). The threaded portion comprises two elements 88, 90 which have internal thread formations and which are capable of limited flexing movement toward and away from one another as in the first embodiment. An O-ring 44 disposed in a transverse groove 87 biases the two elements 88, 90 toward one another and into moderately firm engagement with the threads of the screw 61.

Referring now particularly to FIGS. 12–15, the sleeve 64 is elongate, annular, and has a hollow bore 65. There are oppositely disposed transverse notches 92, 94 and 96, 98 in the annular walls, the notches 92, 94 being axially spaced from the notches 96, 98. The sleeve 64 also has additional notches 100, 102, and 104, 106 respectively, the notches 100 and 102 being disposed opposite one another and axially spaced from the oppositely disposed notches 104, 106. The notches thus form small bridges or webs 108, 110, 112, 114, and 116, 118, 120, 122 of material which join the central part of the sleeve 64 to each of the end parts. The bridges enable limited flexing movement of each of the sleeve parts with respect to one another.

Referring now to FIGS. 8 and 9, the operation of this embodiment can now be readily understood. The screw 61 passes through the hollow bore of the nut 62, the screw threads 63 being engaged by the thread formations on the inner surfaces of the elements 88 and 90. The nut 62 is firmly held at its base by the engagement of the external threads 72 with the internal threads on the sleeve. The latter is supported at its other end by a machine part or reciprocatable carriage 124, which also has a bore 126 of large diameter to receive part of the screw 61. By the above arrangement there is had a self-alignment of the nut 62 on the screw 61 due to the capability of the three separate sleeve parts to independently cant with respect to one another. Slight misalignment of the nut and screw axes is accommodated by the limited flexing of the sleeve at the locations of the bridges 108–122. It can be seen that the above arrangement will operate satisfactorily even under circumstances of non-coincidence of the nut and screw axes, regardless of whether or not the axes are convergent or parallel. In the case where the axes are parallel but slightly non-coincident, the sleeve will bend slightly such that the outer end parts are both parallel to one another and skewed with respect to the center part. As a result, the construction of FIGS. 8–11 provides the advantageous combination of self-alignment and virtually zero backlash of the nut with respect to the screw. The sleeve 64 is preferably constituted of spring steel and the nut 62 constituted of bronze.

FIG. 16 illustrates an alternate construction for the slots in the sleeve. The one slot 128 is shown as having a square or rectangular end, the slot 130 having a rounded end. I have found that such an arrangement provides satisfactory operation, as well as in the case where the ends of both slots are rounded. However, two oppositely disposed slots where both have squared ends has been found to be unsatisfactory, leading to brittleness and breakage of the bridge.

Another embodiment of the invention is illustrated in FIG. 20, showing an anti-backlash nut construction 62 identical to that of FIGS. 8, 9 and 17–19 and an alignment sleeve 64 identical to that of FIGS. 8, 9 and 12–15. As in the previous embodiment, the sleeve has internal threads at one end, which are engaged by the external threads 72 on the base portion 66 of the nut 62. In contrast to the arrangement of FIGS. 8 and 9, the part of the nut 62 in FIG. 20 is disposed exteriorly of the sleeve. The other end of the sleeve is secured in a machine support or reciprocatable carriage 124. In place of an O-ring for biasing the elements 88, 90 together, a garter spring 132, particularly illustrated in FIG. 21, can be employed, the latter being carried in the transverse groove 87 in the outer surfaces of the elements 88, 90. The spring 132 has hook formations at its opposite ends by which they can be secured together to form the desired O-configuration.

This embodiment retains both the anti-backlash and the self-alignment features of the assembly of FIGS. 8 and 9. The screw 13 is engaged by the nut 62 which functions in a manner identical to the nut discussed in connection with the embodiment of FIGS. 8 and 9. The center part of the sleeve 64 is capable of limited independent canting movement with respect to both ends, and hence the nut can undergo limited lateral and tilting movement in order to align itself exactly with the axis of the screw and thus accommodate small misalignments between the latter and the machine support 124 along its path of reciprocation or travel. In this context, the center part of the sleeve 64 is intended to mean that portion between the slots 96, 98 and the slots 100, 102. The other parts of the sleeve which are capable of tilting movement with respect to the center part are the end positions lying beyond the slots 92, 94 and the slots 104, 106, respectively.

Still another embodiment of the invention is illustrated in FIG. 22, showing a nut construction 133 comprising a base portion 134 which has external threads 136 by which the nut is fastened to a machine support 138, and a threaded portion 140. The nut is preferably constituted of spring-steel, and has transverse slots 142, 144 and longitudinal slots similar to those illustrated in FIGS. 6 and 7 of the first embodiment, only one of the longitudinal slots being shown in FIG. 22 and designated 146. The nut 133 thus comprises elements 148, 150. Cemented on the internal surfaces of the elements and forming a part thereof are insert members 152, 154 constituted of anti-friction material such as plastic, porous bronze or graphite-bronze. The insert members 152, 154 together define a hollow bore and have internal thread formations for engagement with the external threads of a screw. This arrangement has the advantage of providing a self-lubricating construction while still maintaining the anti-backlash feature. It will be understood that the fabrication of the entire nut from graphite-impregnated metal would probably not be feasible due to the rigid and brittle nature of the latter. Steel provides the desired resiliency for enabling the flexing movement of the elements toward and away from one another. The insert members 152, 154 have a transverse grooved formation 156 for receiving an O-ring 44 or spring 132 as described above.

Yet another embodiment of the invention is illustrated in FIG. 23, showing the nut construction 133 of FIG. 22 employed with an alignment sleeve 158. As shown, the external threads of the base portion 134 of the nut engage the corresponding internal threads on the one end of the sleeve. The opposite end of the sleeve is provided with external threads 160 engageable with the internal threads of a machine part of reciprocating carriage 162. As in the embodiment of FIGS. 8 and 9, due to the slotted configuration of the sleeve 158, the center part thereof can move indpendently of each of the ends. Thus, the nut can undergo limited lateral and canting movement in order to align itself exactly with the axis of the screw and thus accommodate small misalignments between the latter and the machine part 162 along its path of reciprocation or travel. As in the previous embodiments, the construction of FIG. 23 also retains the anti-backlash feature described above. Although the embodiment of FIG. 20 shows the nut 62 retained in the sleeve 64 by means of external threads 72, other means for fastening the two pieces together could readily be employed, such as providing a snug fit, with or without application of a suitable adhesive. The same is true of the embodiment of FIG. 23. The invention is not intended to be restricted to a nut construction with external threads which are received in corresponding internal threads of a sleeve part. However, when threads are employed, it would be desirable to have a shrink fit therebetween, or alternately to employ an adhesive such as "LOCTITE" (a registered trademark) to provide the necessary permanent joint.

From the above it can be seen that I have provided a novel and improved anti-backlash nut construction with an optional self-alignment sleeve which is both simple in construction and reliable in operation. The nut proper is preferably constituted of a single piece, the same being true of the sleeve. As a result, the assembly employs a minimum number of separate parts. The construction is thus seen to represent a distinct advance and improvement in machine technology.

Variations and modifications are possible without departing from the spirit of the invention.

I claim:

1. An anti-backlash nut construction, comprising in combination:

a. a base portion adapted to be carried by a machine part and having a bore through which a screw can pass, b. a threaded portion connected to said base portion and characterized by a bore aligned with the bore of said base portion, c. said threaded portion having a slotted configuration by which it is divided into a pair of elements having internal surfaces making up the bore thereof, d. said elements having thread formations adapted for engagement with the external threads of a screw extending through said bores, e. said nut construction having a cut-out configuration enabling said pair of elements to have limited movement toward and away from each other, thereby to enable the thread formations thereof to engage a screw with no clearance and looseness, and f. yieldable means carried by the said pair of elements, biasing the same in directions toward each other so as to maintain the absence of said clearance and looseness.

2. The invention as set forth in claim 1, wherein:
a. said element thread formations define an axis,
b. at least one of said elements having an elongate groove substantially parallel with said axis and dividing the thread formations of said one element into two separate threaded flutes.

3. The invention as set forth in claim 1, wherein
a. said threaded portion is elongate and has an annular wall defining the bore thereof,
b. said annular wall having oppositely disposed, longitudinal slots,
c. the corresponding ends of said slots being open at one end of the threaded portion,
d. said annular wall having oppositely disposed transverse slots communicating with the bore of the threaded portion,
e. all of said slots defining two hinge formations enabling limited flexing movement of said elements toward and away from one another.

4. The invention as set forth in claim 1, wherein:
a. said yieldable means comprises a transverse groove in the pair of elements, and
b. spring means comprising an O-ring disposed in said groove for biasing the elements toward one another.

5. The invention as set forth in claim 4, and further including:
a. an annular alignment sleeve connected with said base portion,
b. said sleeve having two pairs of oppositely disposed transverse notches in its walls, said notch pairs being axially spaced from one another.
c. each of said notch pairs forming a bridge for enabling limited flexing movement of one part of the sleeve with respect to another.

6. The invention as set forth in claim 5, wherein:
a. said annular sleeve has two additional pairs of oppositely disposed notches in its walls, said additional pairs being axially spaced from one another and from said first-mentioned pairs,
b. said additional notch pairs each forming additional bridges respectively, for enabling limited flexing movement of a third part of the sleeve with respect to said first-mentioned parts.

7. The invention as set forth in claim 5, wherein:
a. said sleeve is elongate and has a hollow bore,
b. said base portion of the nut being disposed in said hollow bore and being permanently retained therein.

8. The invention as set forth in claim 5, wherein:
a. the end of at least one of said notches is rounded.

9. The invention as set forth in claim 5, wherein:
a. the end of at least one of said notches is rectangular.

10. The invention as set forth in claim 1, wherein:
a. said threaded portion comprises elements constituted of graphite-impregnated metal secured in the bore of the threaded portion and adapted to engage the external threads of the screw.

11. The invention as set forth in claim 5, wherein:
a. said threaded portion comprises elements constituted of graphite-impregnated metal secured in the bore of the threaded portion and adapted to engage the external threads of the screw.

12. The invention as set forth in claim 11, wherein:
a. said elements are elongate,
b. said yieldable detent means comprising a transverse grooved formation and spring means disposed therein for biasing the elements toward one another.

13. The invention as set forth in claim 1, wherein:
a. said elements are elongate,
b. said yieldable detent means comprising a transverse grooved formation in the pair of elements and spring means disposed in the grooved formation for biasing the elements toward one another,
c. said spring means comprising a garter spring.

14. A self-aligning nut construction for engagement with the external threads of a screw, comprising in combination:
a. a nut body having threads engageable with said external screw threads,
b. an annular, elongate alignment sleeve connected with said nut body,
c. said sleeve having two pairs of oppositely disposed transverse notches in its walls, said notch pairs being axially spaced from one another,
d. each of said notch pairs forming a bridge for enabling limited flexing movement of one part of the sleeve and the nut body with respect to another part of the sleeve.

15. The invention as set forth in claim 14, wherein:
a. said annular sleeve has two additional pairs of oppositely disposed notches in its walls, said additional pairs being axially spaced from one another and from said firstmentioned pairs,
b. said additional notch pairs each forming additional bridges respectively, for enabling limited flexing movement of a third part of the sleeve with respect to said first-mentioned parts.

16. The invention as set forth in claim 14, wherein:
a. said sleeve has a hollow bore,
b. said body being disposed in said hollow bore and being permanently retained therein.

17. The invention as set forth in claim 14, wherein:
a. the end of at least one of said notches is rounded.

18. The invention as set forth in claim 14, wherein:
a. the end of at least one of said notches is rectangular.

* * * * *

Disclaimer 3,831,460.—*Francis M. Linley, Jr.*, Easton, Conn. ANTI-BACKLASH NUT. Patent dated Aug. 27, 1974. Disclaimer filed Jan. 13, 1975, by the assignee, *Universal Thread Grinding Company*.

Hereby enters this disclaimer to claims 14, 16 and 17 of said patent.

[*Official Gazette July 22, 1975.*]